United States Patent [19]

Sulzbach et al.

[11] 4,338,237
[45] Jul. 6, 1982

[54] PROCESS FOR THE PREPARATION OF AQUEOUS, COLLOIDAL DISPERSIONS OF COPOLYMERS OF THE TETRAFLUOROETHYLENE/ETHYLENE TYPE

[75] Inventors: Reinhard A. Sulzbach; Robert Hartwimmer, both of Burghausen, Fed. Rep. of Germany

[73] Assignee: Hoechst Aktiengesellschaft, Frankfurt, Fed. Rep. of Germany

[21] Appl. No.: 275,881

[22] Filed: Jun. 22, 1981

[30] Foreign Application Priority Data

Jun. 28, 1980 [DE] Fed. Rep. of Germany ....... 3024450

[51] Int. Cl.³ .............................................. C08K 5/32
[52] U.S. Cl. ................................... 524/777; 526/91; 526/211; 526/255; 524/767
[58] Field of Search ................... 260/29.6 N, 29.6 T, 260/29.6 F; 526/91, 255, 211

[56] References Cited

U.S. PATENT DOCUMENTS

| | | | |
|---|---|---|---|
| 3,704,285 | 11/1972 | Porter | 260/87.5 A |
| 3,707,519 | 12/1972 | Hahn | 260/29.6 F |
| 3,859,262 | 1/1975 | Hartwimmer | 260/80.77 |
| 4,016,345 | 4/1977 | Holmes | 526/206 |
| 4,078,134 | 3/1978 | Kuhls et al. | 526/204 |
| 4,098,975 | 7/1978 | Shimuzo et al. | 526/73 |
| 4,123,602 | 10/1978 | Ukinashi et al. | 526/206 |

Primary Examiner—Joseph L. Schofer
Assistant Examiner—Bernard Lipman
Attorney, Agent, or Firm—Connolly and Hutz

[57] ABSTRACT

An improved process for the preparation of aqueous, colloidal dispersions of copolymers comprising at most 60 mole % of units of tetrafluoroethylene, 60 to 40 mole % of units of ethylene and 0 to 15 mole % of units of at least one other α-olefinic monomer, which can be copolymerized with tetrafluoroethylene and ethylene, in the presence of manganese compounds as the catalyst is described. In this process, the emulsion polymerization is carried out in an aqueous phase in the presence (a) of a chain transfer agent of the formula $X-CH_2-COOR$ ($X=Cl$, Br, COOH, COOR, COCH$_3$, CH$_3$, C$_2$H$_5$ or C$_3$H$_7$; and $R=C_1-C_4$-alkyl), and (b) of a compound which stabilizes the dispersion and has the formula

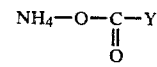

($Y=COONH_4$, COOH, CH$_3$, CH$_2$OH, CH$_2$COOH or CH$_2$COONH$_4$). (b) can additionally contain an ammonium salt of an inorganic non-metal acid, for example ammonium chloride or fluoride. Terpolymers or quaterpolymers containing, in addition to tetrafluoroethylene and ethylene, preferably hexafluoropropylene and/or a "bulky" vinyl monomer as the third and/or fourth comonomer are preferably prepared. The copolymer dispersions thus prepared have very low coagulate contents and are very stable and the copolymers have melt flow indices most appropriate to the processing operations. They can be processed to coatings and shaped articles.

4 Claims, No Drawings

PROCESS FOR THE PREPARATION OF AQUEOUS, COLLOIDAL DISPERSIONS OF COPOLYMERS OF THE TETRAFLUOROETHYLENE/ETHYLENE TYPE

The invention relates to a process for the preparation of stable, aqueous, colloidal dispersions of copolymers of the tetrafluoroethylene type in the presence of chain transfer agents.

Copolymers of tetrafluoroethylene and ethylene units are known. They have an excellent stability to changes in temperature and to chemicals and can be processed from the melt by thermoplastic shaping processes. However, the copolymers consisting exclusively of tetrafluoroethylene and ethylene units are somewhat brittle in the temperature range between 150° C. and 200° C. An improvement is achieved by incorporating into the chains of these copolymers units of other vinyl monomers in an amount of up to 15 mole %.

Such copolymers comprising tetrafluoroethylene, ethylene and, if appropriate, other monomers are usually prepared by polymerization in organic solvents, fluoroalkanes and fluorochloroalkanes having proved to be advantageous solvents. This type of copolymerization in organic solvents gives a suspension of the copolymer particles with a mean particle diameter of $>10$ $\mu m$ in the solvent. The fluoroalkanes or fluorochloralkanes employed for this purpose are expensive substances which must as far as possible be recovered. Attempts have therefore already been made to carry out the copolymerization of tetrafluoroethylene and ethylene in mixtures of water and an organic solvent or in a purely aqueous reaction medium. The use of fluorochloroalkanes in a mixture with water is described in Japanese Allowed Patent Specification No. 49-011,746 and in Japanese Laid-Open Patent Application No. 49-024,295. A process in which 10 to 150% by weight of a fluorochloralkane is added to the aqueous reaction medium as a reaction accelerator is known from German Offenlegungsschrift No. 2,444,516. Mixtures of tert.-butyl alcohol and water are recommended as the reaction medium in U.S. Pat. No. 2,468,664 and U.S. Pat. No. 3,401,155. However, stable aqueous dispersions comprising colloidal particles of copolymers of the tetrafluoroethylene/ethylene type cannot be prepared by these processes mentioned. It is also not possible to prepare stable aqueous, colloidal dispersions of such tetrafluoroethylene/ethylene copolymers under conditions such as are customary for the preparation of aqueous, colloidal dispersions of polytetrafluoroethylene, that is to say in the presence of perfluorinated emulsifiers and watersoluble peroxidic compounds or redox systems as catalysts. Under these conditions, either no reaction takes place or the dispersions already coagulate at a very low solids content, unless additional organic solvents, such as, for example, trifluorotrichloroethane, are used as stabilizing additives (Italian Pat. No. 874,129).

The preparation of colloidal dispersions in a purely aqueous phase became possible when it was found that aqueous dispersions of tetrafluoroethylene/ethylene copolymers with a solids content of up to about 15% by weight can be obtained using manganese acids or salts thereof as catalysts in the presence of customary emulsifiers. This is described in U.S. Pat. No. 3,859,262. However, aqueous, colloidal dispersions of copolymers of tetrafluoroethylene and ethylene (and, if appropriate, other monomers) which have too high a molecular weight, and, as a result, too high a melt viscosity (or too low a melt flow index), for processing of the copolymer by thermoplastic shaping processes are obtained by this known procedure. As a further disadvantage, the aqueous, colloidal dispersions prepared by this known process have an unsatisfactory dispersion stability, that is to say they tend to coagulate, and coagulate completely if the copolymer solids content exceeds 15% by weight during the preparation.

There was thus the object of improving the process for the preparation of aqueous, colloidal dispersions of copolymers of the tetrafluoroethylene/ethylene type in the presence of manganese acids or salts thereof as catalysts, to the effect that the mean molecular weight of the colloidally dispersed copolymers is reduced and the melt viscosity of these copolymers is thus adjusted to within the range necessary for the processing operation, and, at the same time, the stability of the copolymer dispersions formed is increased such that colloidal dispersions of tetrafluoroethylene/ethylene copolymers with a solids content of more than 15% by weight can be prepared directly by copolymerization in the purely aqueous phase without substantial formation of coagulate and without the addition of organic solvents.

To achieve this object, the present invention provides a process for preparing a stable, aqueous, colloidal dispersion of a copolymer containing as comonomers in copolymerized form at most 60 mole percent of tetrafluoroethylene, from 60 to 40 mole percent of ethylene, and from 0 to 15 mole percent of at least one additional α-olefinic comonomer copolymerizable with tetrafluoroethylene and ethylene, by copolymerization of said comonomers in an aqueous medium having dissolved therein a fluorinated emulsifying agent and a catalyst selected from the group of acids of manganese, their salts, and manganese compounds capable of being converted into said manganese acids or salts thereof under copolymerization conditions, which comprises copolymerizing in the presence of (a) a chain transfer agent of the general formula X—CH$_2$—COOR wherein X is Cl, Br, COOH, COOR, COCH$_3$, CH$_3$, C$_2$H$_5$, or C$_3$H$_7$; and R is an alkyl group having of from 1 to 4 carbon atoms; or a mixture thereof, and (b) a dispersion-stabilizing compound of the general formula

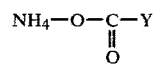

wherein Y is COONH$_4$, COOH, CH$_3$, CH$_2$OH, CH$_2$COOH, or CH$_2$COONH$_4$, including hydrates and mixtures of said compounds, said dispersion-stabilizing compound being present in an amount of at least 0.001 mole/l aqueous medium.

It is indeed known to carry out the polymerization of fluoroolefins in the presence of chain transfer agents, and a large number of classes of compounds have already been proposed for this purpose. The copolymerization of tetrafluoroethylene and ethylene (and, if appropriate, other additional monomers) in organic solvents has also already been carried out in the presence of chain transfer agents, for example in the presence of acetone or cyclohexane, in isolated cases. However, when the copolymerization of tetrafluoroethylene and ethylene and, if appropriate, other monomers is carried out in a purely aqueous phase, these chain transfer agents have one, several or all of the disadvantages mentioned in the following text: the molecular weight-regulating action is insufficient, the rate of polymerization is too greatly reduced, the dispersion stability is drastically reduced, or the properties of the pulverulent copolymers formed by coagulation are considerably impaired, which is manifested, for example, by blistering, discoloration or poorer mechanical properties of shaped articles produced therefrom.

It was therefore surprising that none of these disadvantages occur if a combination of the said chain transfer agents (a) and the said compounds (b) which stabilize the colloidal dispersions is employed in the abovementioned process.

Preferred chain transfer agents (a) are the dimethyl ester, the methyl ethyl ester and, in particular, the diethyl ester of malonic acid.

The amount of chain transfer agent to be added depends on its molecular weight-regulating action. In order to achieve a melt flow index value (MFI value; MFI = melt flow index) within the range most appropriate to the processing operation, an amount of 0.005 to 0.07 mole of the chain transfer agent per kg of copolymer solids formed is required, but these limits are not absolutely critical. In the case of the preferred diethyl malonate, this amount is 0.01 to 0.035 per kg of copolymer solids formed. If a MFI value in the range from 15 to 50 g/10 minutes (measured at 300° C. under a load weighing 11 kg), which is particular advantageous for the production of wire coatings, is to be established, the amount is 0.02 to 0.03 per kg of copolymer solids formed. Within the scope of the invention, mixtures of the chain transfer agents mentioned can also be added.

A compound (b) which stabilizes the aqueous colloidal dispersion and is selected from the group comprising the abovementioned monoammonium or diammonium salts is present, in combination with this chain transfer agent, during the copolymerization, monoammonium oxalate and, above all, diammonium oxalate being preferred. The stabilizing compounds mentioned can also be in the form of hydrates. It is also possible to employ mixtures of compounds from the group mentioned. These compounds which stabilize the dispersion must be present in a minimum concentration of 0.01 mole/l, relative to the aqueous polymerization medium. The upper limit, which is not absolutely critical, is 0.1 mole/l, and 0.02 to 0.05 mole/l is preferably employed.

The entire amount of chain transfer agent is preferably introduced into the reactor before the polymerization starts. However, it is also possible initially to introduce only a part amount and subsequently to meter in the remainder in portions or continuously during the polymerization. The critical lower limit for the stabilizing agent is 0.01 mole per 1 of aqueous polymerization medium. This amount must be initially introduced into the reactor before the start of polymerization, and further amounts can subsequently be metered in, if appropriate, during the polymerization.

It is expedient for the said compounds (b) which stabilize the dispersion to be employed as a mixture with ammonium salts of inorganic non-metal acids. These salts are, in particular, ammonium chloride, ammonium fluoride, ammonium dihydrogen phosphate, ammonium borate, ammonium bisulfate, ammonium nitrate and ammonium formate, or other ammonium salts of inorganic non-metal acids which are converted into the said ammonium salts under the conditions prevailing in the aqueous medium during the copolymerization, that is to say at pH values from 6 to 1, preferably from 4 to 2. These ammonium salts of inorganic non-metal acids which are additionally employed are added in an amount of 0 to 0.1 mole/l of aqueous polymerization medium.

Both the compounds (b) which stabilize the dispersion and the ammonium salts of inorganic non-metal acids which are additionally added, if appropriate, can be added in the form of the free acids together with ammonia, that is to say they are formed in situ in the aqueous polymerization medium.

The acids and salts of manganese, such as are described in U.S. Pat. No. 3,859,262 employed as catalysts in the emulsion polymerization process according to the invention. These compounds are, in particular, the salts of permanganic acid, such as potassium permanganate, sodium permanganate, barium permanganate and magnesium permanganate; and also salts of manganic acid, that is to say the manganates, such as, for example, potassium manganate, ammonium manganate, sodium manganate and calcium manganate; and the salts of hypomanganic acid, such as sodium hypomanganate ($Na_3MnO_4.10H_2O$) and the salts of manganous acid, that is to say the manganites, are furthermore suitable. The free acids themselves can also be used as catalysts, such as, for example, the crystalline dihydrate of permanganic acid ($HMnO_4.2H_2O$), as long as they are stable in the aqueous-acid medium. Substances which are converted into the abovementioned compounds only under the polymerization conditions, such as, for example, acid anhydrides, such as manganese heptoxide ($Mn_2O_7$), and also hydrated oxides, acid halides and other readily hydrolyzable higher-valent manganese compounds, are also active catalysts. Alkali metal permanganates and alkali metal manganates or the corresponding $NH_4$ salts, in particular potassium permanganate and potassium manganate, can most advantageously be used. The readiness of the individual monomers to polymerize differs greatly, but in most cases a catalyst amount of 0.001 to 0.5% by weight, preferably 0.003 to 0.3% by weight, relative to the total amount of the polymerization liquor, is sufficient. If appropriate, some of this amount of catalyst can subsequently be added during the polymerization time.

The emulsifiers used are the surface-active, fluorinated compounds which are customary for the emulsion polymerization of fluoroolefins and are capable of reducing the surface tension by at least 20 mN/m under the polymerization conditions. Such fluorinated emulsifiers are, in particular, compounds of the general formula Y—Rf—Z—M. In this formula, Y is H, Cl or F; Rf is the group $C_aF_{2a}$, in which a is a number from 5 to 10, or the group

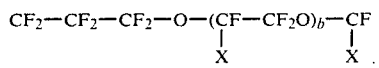

in which X is F or $CF_3$ and b is a number from 0 to 3; Z is the group COO or $SO_3$; and M is an alkali metal or —$N(R)_4$, in which R denotes hydrogen or an alkyl radical with 1 or 2 C atoms.

The ammonium salts of perfluorooctanoic acid and perfluorooctanesulfonic acid are preferred. It is also possible to employ mixtures of the emulsifiers mentioned. These emulsifiers should be present in a concentration of 0.06 to 1.0% by weight, preferably 0.1 to 0.6% by weight, relative to the aqueous polymerization medium.

In addition to these fluorinated emulsifiers, surface-active stabilizing emulsifiers, the surface-active properties of which differ from those of the abovementioned stabilizing compounds of component (b) and which are known to the expert, can also be added, and in particular in an amount of 0.005 to 0.05% by weight, relative to the aqueous polymerization medium. Preferred surface-active stabilizing emulsifiers are compounds of the formula $R'—(C_6H_4)_c—(O—CH_2—CH_2)_d—OH$, in which $R'$ denotes a primary, secondary or tertiary alkyl group with 1 to 20 C atoms, c can assume the value 0 or 1 and d can assume a value from 4 to 50.

It is also possible initially to introduce all of the fluorinated emulsifiers and all of the surface-active stabilizing emulsifiers before the start of polymerization, or part amounts can subsequently be metered in as the polymerization proceeds. However, subsequent metering-in should have ended before a solids content of 10% by weight is reached.

The polymerization pressure of the overall monomer mixture is in the customary range from 5 to 50 bars, preferably 10 to 25 bars. The copolymerization is carried out in the temperature range from $-5°$ to $+50°$ C., which is likewise customary, and preferably at 20° to 40° C.

Aqueous, colloidal dispersions of copolymers containing at most 60 (and at least 30) mole % of copolymerized units of tetrafluoroethylene and 60 to 40 mole % of copolymerized units of ethylene, and, in addition, 0 to 15 mole %, preferably 0 to 8 mole %, of at least one other $\alpha$-olefinic monomer, the lower limit of the content of such a monomer or monomers being 0.05 mole %, preferably 0.5 mole %, should one or more such monomers be present, can be prepared by the process according to the invention. Terpolymers and quaterpolymers are preferably prepared. The terpolymers can contain, in addition to ethylene and tetrafluoroethylene, the following $\alpha$-olefinic monomers in the amounts mentioned:

($c_1$) Perfluorinated olefins of the formula $CF_2=CF—Rf1$, in which Rf1 is perfluoroalkyl radical with 2 to 10, preferably with 2 to 5, C atoms. The preferred compounds include, in particular, perfluoropentene, perfluorohexene and perfluoroheptene. The preparation of such longer-chain perfluorinated olefins is known, and is described, for example, in U.S. Pat. No. 2,668,864.

($c_2$) Perfluorinated vinyl ethers of the formula $CF_2=CF—O—Rf2$, in which Rf2 is a perfluoroalkyl radical with 1 to 10, preferably 1 to 4, C atoms. Examples which may be mentioned are the perfluoro-n-ethyl radical, the perfluoro-n-butyl radical and, in particular, the perfluoro-n-propyl radical. The preparation of such perfluoro(alkylvinyl) ethers is known from U.S. Pat. No. 3,180,895.

($c_3$) Perfluorinated vinyl ethers of the formula

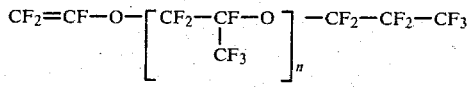

in which n is a number from 1 to 4, preferably 1 or 2. The preparation of such perfluorinated vinyl ethers is known from U.S. Pat. No. 3,450,684.

($c_4$) Perfluorinated vinyl ethers of the formula

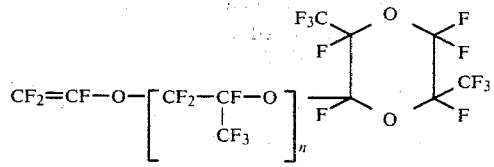

in which n is 0 or 1, preferably 0. The preparation of these monomers is described in U.S. Pat. No. 4,013,689

($c_5$) Perfluoro-2-methylene-4-methyl-1,3-dioxolane, the preparation of which is known from U.S. Pat. No. 3,308,107.

($c_6$) Perfluorinated vinyl ethers of the general formula $CF_2=CF—O—(CF_2)_n—COX_1$, in which $X_1$ represents OH, $OR_1$ or $NR_2R_3$, and in which $R_1$ is an alkyl group with 1 to 3 C atoms, $R_2$ and $R_3$ each represent a hydrogen atom or $R_1$ and n denotes a number from 1 to 10. The preparation of such monomers is known from British Pat. No. 1,145,445. $X_1$ is preferably OH or $OCH_3$.

($c_7$) Fluorinated vinyl ethers of the formula

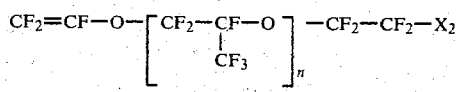

in which $X_2$ represents $COOR_4$, COOH or CN, $R_4$ denotes an alkyl group with 1 to 3 C atoms and n denotes an integer from 1 to 4. The preparation of such comonomers is described in U.S. Pat. No. 4,138,426 $X_2$ is preferably COOH or $COOCH_3$.

($c_8$) Perfluoroalkyl-substituted vinyl compounds of the formula $CH_2=CH—Rf3$, in which Rf3 is a perfluoroalkyl radical with 2 to 10, preferably 2 to 6, C atoms. Such partially fluorinated olefins are prepared by addition of ethylene onto a perfluoroalkyl iodide and subsequent dehydrohalogenation with an alkali metal hydroxide, as described in U.S. Pat. No. 3,535,381.

($c_9$) 1,1,1-Trifluoro-2-(trifluoromethyl)-4-penten-2-ol

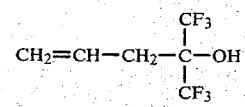

the preparation of which is known from U.S. Pat. No. 3,444,148.

($c_{10}$) Allyl 2-hydroxy-hexafluoroisopropyl ether

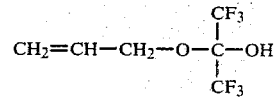

which is formed by addition of allyl alcohol onto hexafluoroacetone, as described in French Pat. No. 2,178,724.

($c_{11}$) Compounds of the general formula $CH_2=CH—(CH_2)_n—O—CF_2—CFX_3H$, in which $X_3$ is F, Cl or trifluoromethyl, preferably F, and n is zero or 1. Monomers in which n=1 can be prepared by addition of the corresponding fluoro- or chlorofluoro-olefin onto allyl alcohol, as described in U.S. Pat. No. 2,975,161. Monomers in which n=0 can be prepared according to U.S. Pat. No. 2,631,975.

($c_{12}$) Allyl esters or methallyl esters of the formula $CH_2=CR_5-CH_2-O-CO-R_6$, in which $R_5$ is H or $CH_3$ and $R_6$ is an alkyl radical with 1 to 3 C atoms, preferably a methyl radical.

($c_{13}$) Vinyl esters of the general formula $CH_2=CH-O-CO-R_7$, in which $R_7$ is an alkyl radical with 1 to 3 C atoms, in particular a methyl radical.

($c_{14}$) α-Olefins with 3 to 4 C atoms, preferably isobutylene.

($c_{15}$) Acrylic acid esters and methacrylic acid esters, in particular their methyl to butyl esters.

($c_{16}$) Hexafluoropropylene.

($c_{17}$) Vinylidene fluoride.

($c_{18}$) Trifluorochloroethylene.

Preferred termonomers (in addition to tetrafluoroethylene and ethylene) in these terpolymers are the abovementioned monomers of groups ($c_2$), ($c_3$), ($c_4$), ($c_{11}$), ($c_{13}$), ($c_{16}$) and ($c_{17}$), and of these, in particular, the representatives mentioned as preferred.

It is also possible to obtain aqueous, colloidal dispersions of quaterpolymers or of copolymers of an even higher order by the process according to the invention, by using a mixture of two or more of the monomers mentioned under ($c_1$) to ($c_{18}$). Quaterpolymers of tetrafluoroethylene/ethylene/hexafluoropropylene and vinylidene fluoride or trifluorochloroethylene are preferred, and those which also contain, in addition to tetrafluoroethylene, ethylene and hexafluoropropylene, a monomer from the abovementioned groups ($c_1$) to ($c_{13}$) are particularly preferred, groups ($c_2$) ($c_3$), ($c_4$), ($c_{11}$) and ($c_{13}$) in turn being preferred amongst the latter. Such quaterpolymers comprise 55 to 30 mole %, preferably 55 to 40 mole %, of copolymerized units of tetrafluoroethylene, 60 to 40 mole %, preferably 55 to 45 mole %, of copolymerized units of ethylene, 10 to 1.5 mole %, preferably 8 to 3 mole % and in particular 5 to 3 mole %, of copolymerized units of hexafluoropropylene, and 2.5 to 0.05 mole %, preferably 1 to 0.1 mole % and in particular 0.8 to 0.2 mole %, of copolymerized units of the other monomers from the above mentioned groups ($c_1$) to ($c_{13}$), the 4 constituents in each case making up 100 mole %.

In order to obtain the abovementioned composition of the copolymers which constitute the aqueous, colloidal dispersions, the molar ratios of the monomers employed are to be as follows during the copolymerization: before the start of the copolymerization, a monomer mixture of tetrafluoroethylene and ethylene in a molar ratio in the range from 50:50 to 90:10, preferably 65:35 to 75:25, is established by forcing the monomers into the reaction vessel under pressure. During the polymerization, tetrafluoroethylene and ethylene are added in a molar ratio in the range from 40:60 to 60:40, and, if appropriate, the other monomers are added in an amount of 0.05 to 15 mole %, preferably 0.5 to 8 mole %, relative to the total monomer mixture, in which case the ratio of tetrafluoroethylene to ethylene is to be adapted accordingly and the amount of tetrafluoroethylene can fall to 30 mole %.

Aqueous, colloidal dispersions of the said copolymers with a copolymer solids content of 15 to 30% by weight, relative to the aqueous reaction medium, can be prepared by the process according to the invention. The dispersion particles have a mean particle diameter of 0.05 to 0.35 μm, preferably 0.10 to 0.25 μm. The size distribution of the dispersion particles is very narrow and the particles are spherical.

Coagulate formation is very slight in the process according to the invention. If the emulsion polymerization is carried out to a solids content of 20 to 22% by weight, relative to the aqueous reaction medium, less than 1% by weight of coagulate is found, relative to the amount by weight of colloidally dispersed copolymer solid formed. The aqueous, colloidal dispersions produced in a purely aqueous phase by the process according to the invention can be polymerized directly to high solids contents, whilst polymerization in organic solvents must already be ended at solids contents of less then 15% by weight since thorough mixing of the resulting sludge-like suspensions meets with great difficulties. Recovery of organic solvent is eliminated.

The copolymers constituting the aqueous, colloidal dispersions prepared according to the invention have a MFI value (measured at 300° C. under a load weighing 11 kg) in the range from 5 to 200 g/10 minutes. When the dispersion is used for coating and impregnation purposes, problem-free fusing during stoving of the coatings thus produced and good bonding to the substrate result. Fillers and/or pigments can be added in the customary manner to the copolymer dispersions prepared according to the invention.

The aqueous, colloidal dispersions prepared according to the invention have a viscosity, measured with a rotary viscosimeter at 20° C., in the range from 2 to 4 mPas. They also have an exceptionally high stability towards the effect of shearing forces.

The aqueous, colloidal copolymer dispersions which are prepared by the process according to the invention and have a solids content of 15 to 30% by weight can be desalinated via ion exchangers and concentrated to dispersions with a high solids content of 30 to 60% by weight by known processes, for example by evaporation in vacuo, by settling or layer-separation processes, by electrodecantation or by the ultrafiltration process (German Auslegeschrift No. 2,908,001). The concentrated dispersions are particularly suitable for impregnating or coating threads, fibres and textile sheet-like structures, and also for coating metallic and non-metallic substrates.

The aqueous, colloidal copolymer dispersions prepared by the process according to the invention can also be coagulated by known processes, such as, for example, by the action of mechanical shearing forces or by the addition of electrolytes. It is expedient for the coagulate obtained to be granulated in the melt. In this form, the copolymers can then be processed from the melt by thermoplastic shaping processes to give films, tubes, bars, injection-molded articles and other shaped articles. They are furthermore suitable for the production of monofilaments which have good mechanical properties and can be further processed to woven fabrics with a good stability to heat and chemicals. This applies, in particular, to the terpolymers and quaterpolymers on which the dispersions prepared according to the invention are based. These polymers are particularly suitable for the production of coatings for electrical conductors. The wire coatings thus produced are not brittle at a high temperature and exhibit no tendency to form cracks.

The characteristic parameters given in the description and in the examples are determined by the following measurement methods:

1. Mean particle size

The dispersion is greatly diluted with water, applied to a copper net and dried. A photograph magnified by the factor 17,000 is taken with an electron microscope and in particular with an Elmiskop II from Messrs. Siemens. The photograph is further magnified by the factor 4.25. From the resulting picture, the particle size is then counted with a particle size counting apparatus from Messrs. Zeiss (type TGZ 3). The mean particle diameter is calculated from the resulting distribution curve.

2. MFI value (melt flow index)

The determination is carried out in accordance with the method of DIN Standard Specification No. 53,735-70 with a nozzle 2.1 mm in diameter, a length of 8 mm and at 300° C. under a load weighing 11 kg.

3. Content of tetrafluoroethylene

The content of tetrafluoroethylene (% by weight) is obtained from the fluorine content, which is determined by a procedure in which the copolymer powder obtained from the dispersion is burned in a Wickbald apparatus and the residue is then titrated with thorium nitrate in a potentiograph. If other comonomers are present, the fluorine content is corrected by the fluorine content resulting from the comonomers.

4. Content of hexafluoropropylene

The content of hexafluoropropylene (in % by weight) is determined by IR analysis of films which have been pressed at 280° C. and are between 100 and 300 μm thick. The thickness is measured with a micrometer screw. The analyses are carried out with a Fourier-Transform IR spectrophotometer from Messrs. Nicolet, Model HX 1. For compensation, a similar film of a copolymer comprising exclusively tetrafluoroethylene and ethylene is employed. The band at $\nu = 490$ cm$^{-1}$ is evaluated. The hexafluoropropylene content is calculated from the following formula $$\text{Hexafluoropropylene (\% by weight)} = \frac{\text{Extinction at 490 cm}^{-1}}{\text{Thickness (mm)}} \cdot 3$$

5. Content of other comonomers

The incorporation of other comonomers is determined by mass balance, by determining the total amount of the particular monomer fed to the reactor and subtracting the amount of the particular comonomer which remains in the reactor after the copolymerization.

6. Content of ethylene

The content of ethylene is determined from the difference to make up to 100% by weight.

7. Density

The density is determined in accordance with the method of DIN Standard Specification No. 53,479 on a 2 mm thick strand extruded from the melt.

8. Melting point

The melting point is given as the minimum of the melting range, which is measured with a differential scanning calorimeter (DSC method).

The invention is illustrated by the following examples:

EXAMPLES 1 TO 14

Examples 1 to 14 are carried out under the following reaction conditions:

120 l of desalinated water in which 485 g of diammonium oxalate monohydrate, 485 g of perfluorooctanoic acid and the amount of diethyl malonate given in Table I are dissolved are introduced into an enamelled polymerization reactor which has a total volume of 190 l and is equipped with a baffle and an impeller stirrer. The polymerization reactor is first flushed with nitrogen and then with tetrafluoroethylene. The stirrer speed is adjusted to 235 revolutions/minute, and the amounts of the first and, if appropriate, of the second other comonomer given in Table I are then introduced. Tetrafluoroethylene is subsequently forced in up to a total monomer pressure of 13.7 bars, and ethylene is then forced in up to a total monomer pressure of 17 bars. Thereafter, the polymerization is inititated by pumping in a solution of potassium permaganate with a concentration of 20 g of KMnO$_4$ per liter of water. After the start of polymerization, the supply of potassium permanganate solution is regulated such that a polymerization rate of about 40 to about 100 g/l. hour is achieved. The polymerization temperature is 26° to 27° C. The resulting heat of polymerization is removed with a coolant via the cooling jacket of the polymerization reactor. The total monomer pressure of 17 bars is automatically maintained by continuous feeding-in of a tetrafluoroethylene/ethylene mixture in a molar ratio of 1:1. During the course of the polymerization the further amounts of other comonomers given in Table I are metered in continuously. The reaction is terminated at a copolymer solids content, relative to the aqueous reaction medium employed, of about 22%, by weight (Example 11: 27% by weight) by letting down the monomer mixture. The coagulate formed is separated off by filtration and is dried and weighed. The exact solids content of the filtered dispersion is determined by testing with a hydrometer. The amount of potassium permanganate employed, polymerization time, amount of aqueous dispersion, polymer solids content, mean particle size and amount of coagulate are given in Table I.

The dispersion is now coagulated by means of a high-speed stirrer. The copolymer solid which has precipitated is separated off from the liquor, washed several times with water and then dried under a nitrogen atmosphere at 200° C. for 15 hours and subsequently granulated from the melt. The composition of the resulting copolymers and their melting points and densities are then determined, and are given in Table II. The MFI$_{11}$ value (300° C.) of these copolymers is given in Table I.

EXAMPLES 15 TO 29

In Examples 15 to 29, various chain transfer agents (a) and various compounds (b) which stabilize the dispersion are employed for a constant monomer composition. 28 l of desalinated water in which the amounts of chain transfer agents, of stabilizing compound and, is appropriate, of additional ammonium salt of an inorganic acid which are given in Table I and 116 g of perfluorooctanoic acid are dissolved are introduced into an enamelled polymerization reactor which has a total volume of 50 l and is equipped with a baffle and impeller stirrer. In Example 29, 0.01% by weight, relative to the aqueous reaction medium, of p-isooctylphenol which has been oxyethylated with on average 10 ethylene oxide units is additionally employed. The polymerization reactor is flushed first with nitrogen and then with tetrafluoroethylene. The stirrer speed is adjusted to 260 revolutions/minute. 440 g of hexafluoropropylene are then introduced. The further procedure followed is now as described for Examples 1 to 14. During the course of the polymerization, a further 870 g of hexafluoropropylene are metered in continuously as another comonomer. The polymerization is terminated at a copolymer solids content, relative to the aqueous reaction medium employed, of about 20% by weight by letting down the monomer mixture. The amount of potassium permanganate employed, the polymerization time, the amount of aqueous dispersion obtained, the copolymer solids content, the mean particle size, the amount of coagulate formed and the $MFI_{11}$ value (300° C.) of the resulting copolymers are given in Table I.

The copolymers prepared in Examples 15 to 29 are composed of: 49 mole % of tetrafluoroethylene, 46.5 mole % of ethylene and 4.5 mole % of hexafluoropropylene.

TABLE I

| Example No. | 1 | 2 | 3 | 4 | 5 | 6 |
|---|---|---|---|---|---|---|
| Chain transfer agent, nature | MEE | MEE | MEE | MEE | MEE | MEE |
| (mole/kg of polymer solid) | 0.024 | 0.025 | 0.023 | 0.022 | 0.023 | 0.022 |
| Stabilizing compound, nature | AO | AO | AO | AO | AO | AO |
| (mole/l of aqueous polymerization medium) | 0.028 | 0.028 | 0.028 | 0.028 | 0.028 | 0.028 |
| Additional ammonium salt, nature | — | — | — | — | — | — |
| (mole/l of aqueous polymerization medium) | — | — | — | — | — | — |
| Perfluorooctanoic acid | 4.0 | 4.0 | 4.0 | 4.0 | 4.0 | 4.0 |
| (g/l of aqueous polymerization medium) | | | | | | |
| Nature of the first other comonomer | I | I | VI | II | II | III |
| Total amount (g) | 2000 | 2000 | 4600 | 2400 | 2400 | 300 |
| amount initially introduced (g) | 500 | 500 | 1500 | 600 | 600 | 0 |
| amount subsequently metered in (g) | 1500 | 1500 | 3100 | 1800 | 1800 | 300 |
| Nature of the second other comonomer | VI | — | — | VI | — | VI |
| Total amount (g) | 4600 | — | — | 4600 | — | 4600 |
| amount initially introduced (g) | 1500 | — | — | 1500 | — | 1500 |
| amount subsequently metered in (g) | 3100 | — | — | 3100 | — | 3100 |
| Amount of potassium permanganate added (g) | 138 | 36 | 198 | 150 | 46 | 116 |
| Polymerization time (hour) | 5.6 | 4.0 | 5.4 | 5.5 | 5.0 | 6.0 |
| Amount of aqueous dispersion obtained (kg) | 156 | 161 | 164 | 169 | 161 | 164 |
| Polymer solids content (% by weight) | 22.0 | 22.0 | 22.2 | 21.6 | 22.0 | 22.8 |
| Mean particle size (μm) | 0.13 | 0.13 | 0.12 | 0.12 | 0.15 | 0.14 |
| Amount of coagulate formed (% by weight, relative to the polymer solids content) | 0.4 | 0.7 | 0.2 | 0.9 | 0.3 | 0.1 |
| $MFI_{11}$ value (300° C.) | 33 | 32 | 28 | 24 | 8 | 42 |

| Example No. | 7 | 8 | 9 | 10 | 11 | 12 | 13 | 14 |
|---|---|---|---|---|---|---|---|---|
| Chain transfer agent, nature | MEE | MEE | MEE | MEE | MEE | MEE | MEE | MEE |
| (mole/kg of polymer solid) | 0.023 | 0.024 | 0.024 | 0.023 | 0.028 | 0.024 | 0.023 | 0.023 |
| Stabilizing compound, nature | AO | AO | AO | AO | AO | AO | AO | AO |
| (mole/l of aqueous polymerization medium) | 0.028 | 0.028 | 0.028 | 0.028 | 0.028 | 0.028 | 0.028 | 0.028 |
| Additional ammonium salt, nature | — | — | — | — | — | — | — | — |
| (mole/l of aqueous polymerization medium) | — | — | — | — | — | — | — | — |
| Perfluorooctanoic acid | 4.0 | 4.0 | 4.0 | 4.0 | 4.0 | 4.0 | 4.0 | 4.0 |
| (g/l of aqueous polymerization medium) | | | | | | | | |
| Nature of the first other comonomer | III | IV | IV | V | — | VI | VIII | VIII |
| Total amount (g) | 300 | 230 | 230 | 1500 | — | 6050 | 400 | 800 |
| amount initially introduced (g) | 0 | 75 | 75 | 375 | — | 2050 | 100 | 400 |
| amount subsequently metered in (g) | 300 | 155 | 155 | 1125 | — | 4000 | 300 | 400 |
| Nature of the second other comonomer | — | VI | — | VI | — | VII | VI | VI |
| Total amount (g) | — | 4600 | — | 4600 | — | 1580 | 4600 | 4600 |
| amount initially introduced (g) | — | 1500 | — | 1500 | — | 395 | 1500 | 1500 |
| amount subsequently metered in (g) | — | 3100 | — | 3100 | — | 1185 | 3100 | 3100 |
| Amount of potassium permanganate added (g) | 46 | 240 | 62 | 92 | 59 | 248 | 108 | 146 |
| Polymerization time (hour) | 4.6 | 7.0 | 4.5 | 5.3 | 3.7 | 6.7 | 5.2 | 5.9 |
| Amount of aqueous dispersion obtained (kg) | 163 | 161 | 159 | 167 | 169 | 168 | 166 | 169 |
| Polymer solids content (% by weight) | 22.1 | 21.8 | 22.0 | 21.6 | 27.0 | 21.7 | 22.2 | 21.2 |
| Mean particle size (μm) | 0.13 | 0.2 | 0.2 | 0.17 | 0.19 | 0.15 | 0.14 | 0.15 |
| Amount of coagulate formed (% by weight, relative to the polymer solids content) | 0.3 | 0.8 | 0.4 | 0.7 | 0.8 | 0.7 | 0.5 | 0.8 |
| $MFI_{11}$ value (300° C.) | 14 | 37 | 11 | 40 | 20 | 78 | 23 | 40 |

| Example No. | 15 | 16 | 17 | 18 | 19 | 20 | 21 |
|---|---|---|---|---|---|---|---|
| Chain transfer agent, nature | MEE | MEE | MEE | MEE | MEE | MEE | MEE |
| (mole/kg of polymer solid) | 0.026 | 0.026 | 0.026 | 0.025 | 0.025 | 0.025 | 0.015 |
| Stabilizing compound, nature | AO | AO | AO | AO | AO | AO | AO |
| (mole/l of aqueous polymerization medium) | 0.015 | 0.007 | 0.015 | 0.015 | 0.015 | 0.032 | 0.029 |
| Additional ammonium salt, nature | — | AA | AA | AP | AC | — | — |
| (mole/l of aqueous polymerization medium) | — | 0.016 | 0.016 | 0.016 | 0.016 | — | — |
| Perfluorooctanoic acid | 4.1 | 4.1 | 4.1 | 4.1 | 4.1 | 4.1 | 4.1 |
| (g/l of aqueous polymerization medium) | | | | | | | |
| Nature of the first other comonomer | VI | VI | VI | VI | VI | VI | VI |
| Total amount (g) | 1310 | 1310 | 1310 | 1310 | 1310 | 1310 | 1310 |
| amount initially introduced (g) | 440 | 440 | 440 | 440 | 440 | 440 | 440 |
| amount subsequently metered in (g) | 870 | 870 | 870 | 870 | 870 | 870 | 870 |
| Nature of the second other comonomer | — | — | — | — | — | — | — |
| Total amount (g) | — | — | — | — | — | — | — |
| amount initially introduced (g) | — | — | — | — | — | — | — |

TABLE I-continued

| | | | | | | | |
|---|---|---|---|---|---|---|---|
| amount subsequently metered in (g) | — | — | — | — | — | — | — |
| Amount of potassium permanganate added (g) | 20 | 23 | 17 | 24 | 23 | 40 | 20 |
| Polymerization time (hour) | 4.4 | 4.5 | 4.5 | 4.6 | 4.3 | 5.5 | 4.1 |
| Amount of aqueous dispersion obtained (kg) | 36 | 37 | 37 | 37 | 37 | 37 | 37 |
| Polymer solids content (% by weight) | 19.9 | 19.7 | 19.8 | 20.1 | 20.5 | 20.1 | 19.3 |
| Mean particle size (μm) | 0.16 | 0.15 | 0.15 | 0.14 | 0.15 | 0.13 | 0.15 |
| Amount of coagulate formed (% by weight, relative to the polymer solids content) | 0.1 | 0.1 | 0.0 | 0.3 | 0.2 | 0.4 | 0.3 |
| $MFI_{11}$ value (300° C.) | 25 | 22 | 21 | 27 | 24 | 25 | 6 |

| Example No. | 22 | 23 | 24 | 25 | 26 | 27 | 28 | 29 |
|---|---|---|---|---|---|---|---|---|
| Chain transfer agent, nature | MEE | MME | CEE | BEE | PME | PEE | BME | MEE |
| (mole/kg of polymer solid) | 0.034 | 0.045 | 0.027 | 0.021 | 0.047 | 0.031 | 0.044 | 0.025 |
| Stabilizing compound, nature | AO | AO | AO | AO | AO | AO | AO | AO |
| (mole/l of aqueous polymerization medium) | 0.029 | 0.029 | 0.029 | 0.029 | 0.029 | 0.029 | 0.029 | 0.029 |
| Additional ammonium salt, nature | — | — | — | — | — | — | — | — |
| (mole/l of aqueous polymerization medium) | — | — | — | — | — | — | — | — |
| Perfluorooctanoic acid (g/l of aqueous polymerization medium) | 4.1 | 4.1 | 4.1 | 4.1 | 4.1 | 4.1 | 4.1 | 4.1 |
| Nature of the first other comonomer | VI | VI | VI | VI | VI | VI | VI | VI |
| Total amount (g) | 1310 | 1310 | 1310 | 1310 | 1310 | 1310 | 1310 | 1310 |
| amount initially introduced (g) | 440 | 440 | 440 | 440 | 440 | 440 | 440 | 440 |
| amount subsequently metered in (g) | 870 | 870 | 870 | 870 | 870 | 870 | 870 | 870 |
| Nature of the second other comonomer | — | — | — | — | — | — | — | — |
| Total amount (g) | — | — | — | — | — | — | — | — |
| amount initially introduced (g) | — | — | — | — | — | — | — | — |
| amount subsequently metered in (g) | — | — | — | — | — | — | — | — |
| Amount of potassium permanganate added (g) | 50 | 43 | 43 | 25 | 35 | 30 | 34 | 45 |
| Polymerization time (hour) | 6.0 | 5.5 | 5.0 | 2.5 | 5.0 | 3.2 | 5.5 | 4.7 |
| Amount of aqueous dispersion obtained (kg) | 37 | 36 | 36 | 36 | 37 | 37 | 37 | 37 |
| Polymer solids content (% by weight) | 20.6 | 20.3 | 20.0 | 19.8 | 19.9 | 20.3 | 19.7 | 20.5 |
| Mean particle size (μm) | 0.14 | 0.18 | 0.15 | 0.15 | 0.17 | 0.13 | 0.12 | 0.13 |
| Amount of coagulate formed (% by weight, relative to the polymer solids content) | 0.4 | 0.7 | 0.8 | 0.1 | 0.4 | 0.3 | 0.8 | 0.2 |
| $MFI_{11}$ value (300° C.) | 184 | 64 | 20 | 63 | 36 | 45 | 65 | 58 |

TABLE II

| Example No. | 1 | 2 | 3 | 4 | 5 | 6 |
|---|---|---|---|---|---|---|
| Composition of the copolymers: | | | | | | |
| Tetrafluoroethylene (mole %) | 46.8 | 52.7 | 48.5 | 47.9 | 48.2 | 48.8 |
| Ethylene (mole %) | 48.1 | 46.6 | 46.8 | 48.1 | 51.5 | 46.8 |
| First other comonomer, nature | I | I | VI | II | II | III |
| First other comonomer (mole %) | 0.8 | 0.7 | 4.7 | 0.4 | 0.4 | 0.3 |
| Second other comonomer, nature | VI | — | — | VI | — | VI |
| Second other comonomer (mole %) | 4.4 | — | — | 3.6 | — | 4.2 |
| Density (g/cm³) | 1.714 | 1.731 | 1.726 | 1.730 | 1.706 | 1.726 |
| Melting point determined by the DSC method (°C.) | 266 | 282 | 267 | 273 | 284 | 271 |

| Example No. | 7 | 8 | 9 | 10 | 11 | 12 |
|---|---|---|---|---|---|---|
| Composition of the copolymers: | | | | | | |
| Tetrafluoroethylene (mole %) | 52.8 | 45.6 | 51.4 | 49.0 | 52.8 | 39.9 |
| Ethylene (mole %) | 46.9 | 49.5 | 48.2 | 46.6 | 47.2 | 53.0 |
| First other comonomer, nature | III | IV | IV | V | — | VI |
| First other comonomer (mole %) | 0.2 | 0.4 | 0.4 | 0.3 | — | 4.9 |
| Second other comonomer, nature | — | VI | — | VI | — | VII |
| Second other comonomer (mole %) | — | 4.5 | — | 4.0 | — | 2.2 |
| Density (g/cm³) | 1.741 | 1.717 | 1.736 | 1.717 | 1.738 | 1.720 |
| Melting point determined by the DSC method (°C.) | 286 | 268 | 293 | 268 | 289 | 248 |

| No. | 13 | 14 |
|---|---|---|
| Composition of the copolymers: | | |
| Tetrafluoroethylene (mole %) | 46.1 | 45.2 |
| Ethylene (mole %) | 49.1 | 50.1 |
| First other comonomer, nature | VIII | VIII |
| First other comonomer (mole %) | 0.2 | 0.4 |
| Second other comonomer, nature | VI | VI |
| Second other comonomer (mole %) | 4.5 | 4.3 |
| Density (g/cm³) | 1.740 | 1.733 |
| Melting point determined by the DSC method (°C.) | 272 | 271 |

The abbreviations used in the above Tables I and II have the following meanings:
MEE = diethyl malonate
MME = dimethyl malonate
CEE = ethyl chloroacetate
BEE = ethyl bromoacetate
PME = methyl n-propionate
BME = methyl n-butyrate PEE=ethyl n-propionate
AO=diammonium oxalate monohydrate
AA=ammonium acetate
AP=ammonium dihydrogen phosphate
AC=ammonium chloride
AM=diammonium malonate

I = $CF_2=CF-O-CF_2-CF_2-CF_3$

II = $CF_2=CF-O-\underset{\underset{CF_3}{|}}{CF}-CF_2-O-CF_2-CF_2-CF_3$

III = $CH_2=CH-CH_2-O-CF_2-CF_2H$

IV = $CH_2=CH-O-\underset{\underset{O}{\|}}{C}-CH_3$

V = 
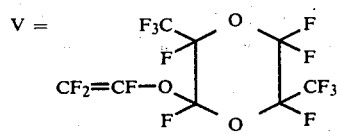

VI = $CF_2=CF-CF_3$

VII = $CF_2=CH_2$

VIII = $CH_2=CH-O-CF_2-CF_2H$

What is claimed is:

1. A process for preparing a stable, aqueous, colloidal dispersion of a copolymer containing as comonomers in copolymerized form at most 60 mole percent of tetrafluoroethylene, from 60 to 40 mole percent of ethylene, and from 0 to 15 mole percent of at least one additional α-olefinic comonomer copolymerizable with tetrafluoroethylene and ethylene, by copolymerization of said comonomers in an aqueous medium having dissolved therein a fluorinated emulsifying agent and a catalyst selected from the group of acids of manganese, their salts, and manganese compounds capable of being converted into said manganese acids or salts thereof under copolymerization conditions, which comprises copolymerizing in the presence of (a) a chain transfer agent of the general formula X—CH$_2$—COOR wherein X is Cl, Br, COOH, COOR, COCH$_3$, CH$_3$, C$_2$H$_5$, or C$_3$H$_7$; and R is an alkyl group having from 1 to 4 carbon atoms; or a mixture thereof, and (b) a dispersion-stabilizing compound of the general formula $$NH_4-O-\underset{\underset{O}{\|}}{C}-Y$$

wherein Y is COONH$_4$, COOH, CH$_3$, CH$_2$OH, CH$_2$COOH, or CH$_2$COONH$_4$, including hydrates and mixtures of said compounds, said dispersion-stabilizing compound being present in an amount of at least 0.001 mole/l aqueous medium.

2. The process of claim 1 wherein the dispersion-stabilizing compound (b) is diammonium oxalate or its hydrate.

3. The process of claim 1 wherein the dispersion-stabilizing compound of component (b) contains additionally an ammonium salt of an inorganic non-metal acid being present in an amount of up to 0.1 mole/l aqueous medium.

4. The process of claim 1 wherein said catalyst is an alkali permanganate or an alkali manganate.

* * * * *